UNITED STATES PATENT OFFICE 2,069,543

PROCESS OF POLYMERIZING HYDROCYANIC ACID AND PRODUCT THEREOF

Horace Chamberlin Adams, Glendora, and Howard Donovan Green, Pasadena, Calif., assignors to E. I. du Pont de Nemours & Company, Wilmington, Del., a corporation of Delaware No Drawing. Application May 3, 1934,
Serial No. 723,796

16 Claims. (Cl. 23—151)

This invention relates to a process for producing decomposition and/or polymerization products from hydrocyanic acid and the new and useful substances resulting therefrom. More particularly it is concerned with the formation of novel solid products from liquid hydrocyanic acid or from aqueous solutions of this acid.

While chemists have believed that absolutely pure hydrocyanic acid is stable in its behavior, it has been known for a considerable length of time that the commercial liquid hydrocyanic acid and aqueous solutions of this acid are generally unstable. In the past experience has indicated the dangerous character of this chemical, and chemists working with the liquid acid have recorded many instances of explosions which have, occasionally, resulted in considerable property damage.

While the dangers of handling hydrocyanic acid have been generally appreciated by chemists, comparatively little is known about the nature of the decomposition reaction or the products resulting therefrom. The decomposition of the material in liquid form or in aqueous solution has been generally recognized to be an exothermic, autocatalytic action but comparatively little is known about the compounds produced by the reaction. Chemists have appreciated that aqueous solutions of hydrocyanic acid could be stabilized by the addition of a small trace of mineral acid, but beyond this their knowledge of the reaction involved or the product or products formed did not extend.

It has been generally appreciated that upon standing hydrocyanic acid rapidly turns brown, forming compounds about which very little is known but which are usually termed by chemists "azulmic compounds". A brown precipitate of azulmic acid is known to result when an aqueous solution of the acid is allowed to stand, especially if the solution is exposed to the action of light.

However, these so-called azulmic compounds have merely been chemical curiosities and with the exception of a single instance the prior art, as revealed by the patents and literature, discloses no apparent utility for these brownish precipitates. The only exception is in the case of the Bohart Patent No. 1,464,802, issued August 14, 1923, which discloses that the so-called azulmic compounds may be used as dyestuffs for producing various shades of yellow and brown. This patent describes the production of a brownish-black amorphous precipitate from aqueous solutions of hydrocyanic acid and a mode of employing this insoluble material as a dye by treating it to render it soluble.

It is one of the objects of the invention herein disclosed to produce new and useful polymerization and/or decomposition products from hydrocyanic acid, using both hydrocyanic acid in liquid form and in the form of its aqueous solutions, by controlling the polymerization and/or decomposition of the acid in the presence of suitable catalysts. The new substances prepared by our novel process have been found particularly useful as activators in chemical reactions, particularly as activators in the metal treating industry.

Another object of the invention forming the subject matter of this application is to effect the polymerization and/or decomposition of hydrocyanic acid in the presence of suitable catalysts. The catalytic agents which have been found effective in the polymerization and/or decomposition process serve to activate what is ordinarily understood to be a dangerous and vehement reaction, frequently occurring with explosive violence, but which is capable of being controlled by suitable means, hereinafter disclosed, so that the process can be rendered commercially valuable without danger of damaging the factory in which it is practiced.

Another object of our invention is to control the reaction by the suitable proportioning of the various constituents of the reaction mixture, the hydrocyanic acid, catalyst and water. The time required by the reaction and the temperatures and pressures developed, as well as the smoothness or lack of smoothness of the chemical change have all been found to depend to some extent on the proportions of the various materials in the reaction vessel. It is an additional object of this invention so to control the relative proportions that the reaction proceeds under the optimum conditions and produces the desired products in satisfactory purity, and amounts.

These and still further objects of the herein disclosed invention will become apparent from the following disclosure which is the best embodiment known to us of utilizing the new process to give satisfactory commercial yields and to produce the novel products which are formed as a result of the reaction.

As catalysts suitable for effecting the polymerization and/or decomposition of the hydrocyanic acid, ammonium salts and alkaline-reacting compounds have been found suitable. Examples of the latter type which have been found satisfactory as catalysts are compounds or salts of the alkali metals or alkaline earth metals which are alkaline in reaction, and aliphatic and aromatic amines. As illustrative of the ammonium salts, the chloride, cyanide, nitrate and sulfate may be given as specific examples. Among the typical alkaline alkali metal salts which are suitable are sodium cyanide, sodium acetate, sodium carbonate, sodium borate, and the corresponding salts of potassium. Suitable alkaline-earth metal compounds are the carbonates, hydroxides, and cyanides. Aliphatic and aromatic amines, either primary, secondary or tertiary, may also be used in our process and we may specify as particular examples methyl amine, ethyl amine, n-propyl amine, aniline, toluidine, benzylamine, the naphthylamines, etc.

Among the inexpensive and readily available substances which are alkaline in reaction, or alkaline when dissolved in liquid hydrocyanic acid or an aqueous solution thereof are ammonia, caustic soda (sodium hydroxide), and soda ash (sodium carbonate $Na_2CO_3$), and all these compounds are suitable catalysts. Of these catalytic or control agents ammonia, either in the form of gaseous $NH_3$ or as ammonium hydroxide (the gas in water solution) has been found to yield the most uniform and satisfactory new products and the smoothest and least violent reaction. When ammonia is used as the catalyst the method permits considerable ease of manipulation and gives uniform results.

Briefly the novel process consists in first placing the desired quantities of the catalyst, water, and hydrocyanic acid in a reaction vessel provided with an agitator or stirrer. This vessel is preferably surrounded by a water jacket through which a stream of water can be circulated. The water in this chamber should preferably be maintained at or below about 68° F. in order to keep the charge considerably below the boiling point of the hydrocyanic acid and prevent appreciable volatilization of the latter. This low temperature must be maintained only until all the reagents are in the reaction vessel, of course. The agitating or stirring mechanism should preferably be put in operation as the reagents are added to the reaction vessel.

The reaction vessel should be open to the atmosphere through a reflux condenser through which brine or some similar cooling medium is circulated. In practice this has been found to be very desirable in order to avoid the development of pressure in the system during the reaction either from external heating of the charge or from the reaction itself.

After charging, water which has been preheated to approximately the boiling point of the charge is pumped through the water jacket in order to expedite the reaction. For example, when the concentration of hydrocyanic acid is 30%, and ammonia in a 6% $NH_3:HCN$ ratio is used as the catalyst, water which has been preheated to about 130° F. may be circulated through the jacket after the reagents have all been introduced into the vessel. As the temperature within the reacting mass rapidly increases, which occurs as the peak of the chemical change is reached, heating is eliminated and the circulating water is used solely to carry away the heat of the reaction, in order to prevent the reaction from becoming too rapid and violent. Although it has been found convenient to carry away the great quantity of heat developed during the peak of the reaction in this manner, it is, of course, conceivable that some other means might be devised for radiating the excess heat.

It will be understood that it is not necessary to preheat the water bath in order to start the reaction and this is done merely to facilitate the commencement. Ordinarily, however, the charge is maintained at a temperature sufficiently high to result in a reaction of reasonable magnitude but prevent an excessively rapid development of heat which not only unduly increases the violence of the reaction but also causes excessive vaporization of the HCN and unnecessary loading of the reflux condensers.

The temperatures which we give as illustrative are those occurring during the three stages or phases of the complete process. Thus it is preferable to maintain a relatively low temperature to avoid losses due to volatilization of the acid while introducing the reagents into the reaction vessel. A higher temperature may be maintained in the water bath during the "incubation period". As the rapid reaction stage is reached, the water bath temperature should be so regulated as to carry away the excessive heat produced by the reaction in order to prevent the latter from becoming too violent.

In relatively dilute solutions (less than 5% HCN in the charge) a stirrer may be omitted, but in those solutions of sufficient strength for use commercially in our process a stirrer is essential for controlling the reaction. It has been found that "bumping" of the reagents is avoided and a more uniformly proceeding process results if a stirrer is included.

The hydrocyanic acid may preferably be introduced into the reaction vessel in liquid form. In practice it has been found most expedient to introduce an aqueous solution of the catalyst first and then start the stirrer. Water is then introduced and finally the acid may be allowed to flow into the vessel. It will be found that losses by volatilization of the hydrocyanic acid can be avoided by keeping the reaction vessel relatively cold until the acid becomes diluted with the remainder of the charge.

The reaction may require eight hours or more as will be explained more fully subsequently. After completion, the polymerization and/or decomposition products formed are removed from the reaction vessel in the form of a slurry and the solids are removed therefrom by filtration. It may be necessary to break the mass up somewhat if it is caked in the container. The filtered solids are then washed with water and dried by the application of heat. The filtrate may be treated to recover the catalyst therein.

It has been found that two distinctly new products are formed by the novel process. These substances are produced in varying amounts, and by suitable regulation of the ingredients or other conditions which will hereinafter more fully appear the yield may be made to be predominantly of one kind or the other. Under some conditions a mixture of both in varying proportions results.

While it is not known whether these products are true polymers, since at times they appear to be formed by decomposition of the hydrocyanic acid, it is generally customary to refer to them as polymers and this practice will be followed herein. At present some chemists believe that they are decomposition products of hydrocyanic acid and not polymerization products.

The first type of product, which we will call polymer "A", is a hard, shiny, black material having an igneous appearance. When freshly made material is pulverized and placed on a watch glass, the individual particles frequently spontaneously jump from their place of rest as if under strain. The second type of product, "polymer B", is a soft, dull black apparently amorphous material which does not exhibit the very reactive characteristic of type A. Polymer B is the type that is most desirable at present for the uses now known as it is more effective as an activator than type A. Both of these products are, so far as we know, novel and have not been produced before. In certain cases it is desirable to employ a mixture of both types in activator use as this permits the adjustment of the activity to any desired value. While reddish brown polymerization products of hydrocyanic acid are well known as we have previously indicated, polymers or decomposition products in the precise physical forms described are new substances.

The greater part of the catalyst used will be found, at the completion of the reaction, in the filtrate, and can be recovered and used over again in controlling another batch as part of the same process. A portion of the catalyst will, however, adhere to the final product during the filtering operation, and the amount that remains in the product will, in general, vary in proportion to the percent of catalyst used in the original charge. When ammonia is used as a catalyst, that part which remains in the product may be driven off by the heat of the drying operation and recovered, but solid catalyst such as sodium hydroxide or sodium carbonate must be removed from the product by washing with water and may be recovered from the washings.

We have discovered the remarkable fact that the time and vehemence of the reaction and the amounts and types of each product resulting may be regulated by suitably selecting the concentration of the various ingredients present in the reaction mixture. As previously stated, it is also usually necessary to stir the mass in order to avoid undesirable "bumping" or localization of the reaction at certain points in the mass. Bumping may result in destruction of the vessel by the application of considerable pressure at one point of the container. The effects of varying the concentration of the reagents on the reaction process will now be considered.

The character of the finished product (whether type A or type B and, if a mixture, the relative proportions of each) seems to be independent of the temperature and pressure, apparently depending entirely on the hydrocyanic acid concentration of the original charge. With hydrocyanic acid concentrations ranging from a relatively very dilute solution to a HCN concentration of somewhere between 56 and 57% the product is entirely type B; the dull amorphous variety. With a higher concentration of hydrocyanic acid type A begins to appear until when the concentration is about 80% (which is the highest value possible when using the commercial 96.5% acid and commercial aqua ammonia (27% NH3) and a NH3:HCN ratio of 6%) the product is about 80% type A. The character of the product changes from pure type B to a mixture of types A and B usually at about 56 or 57% HCN concentration, at least in all cases at somewhere between 55% and 60% HCN concentration. When still higher concentrations of hydrocyanic acid are used (90% or above) with correspondingly low concentrations of catalyst (e. g. 1% NH3:HCN ratio), or when mixtures of lower concentrations of hydrocyanic acid are allowed to react in the presence of a catalyst in such a manner that some of the volatile materials are lost during the reaction, a product consisting of practically pure type A material can be obtained.

With increasing concentrations of hydrocyanic acid there occurs a regular increase in the time required for the reaction. Thus it has been found that with an acid concentration of about 25% the time from the start of the reaction to the development of the maximum temperature is somewhere in the neighborhood of 200 minutes or somewhat over 3 hours. When the concentration of hydrocyanic acid reaches 75% or above, the time from the commencement of the reaction to development of maximum temperature is about 720 minutes or 6 hours. These values are based upon a ratio of catalyst to hydrocyanic acid of about 6%. The value of 6% has been found to be most satisfactory when ammonia is used as the control agent.

It has been found that the maximum reaction temperature developed during the reaction period proper and after the incubation period drops to some extent as the percentage of hydrocyanic acid in the charge is increased. Thus at 30% HCN concentration a temperature of between 200 and 250° F. has been observed during the peak of the reaction while with an 80% concentration the temperature has been found to fall to one within the neighborhood of 150° F. The decrease in maximum temperature appears to proceed linearly with the increase in hydrocyanic acid charge. However it is to be understood that the maximum temperatures developed are not only a function of the charge but also vary with other factors controlling the reaction such as the degree of agitation of the charge and the rate of circulation of the water in the water jacket.

It has been found that the concentration of the catalyst in the mixture has substantially no effect on the character of the products produced, but does have a decided effect on the time of the reaction. Tests have been carried out over the range extending from a very small percentage of the catalyst to the maximum possible limit which is 62% when commercial aqua ammonia (27% NH3) and commercial hydrocyanic acid (96.5%) are employed with a HCN concentration of 30% in the charge. The catalyst concentration is given in all cases as a percentage of the hydrocyanic acid content and represents the catalyst:HCN ratio.

It does not appear that there is any minimum value of catalyst necessary, as we have found that polymerization of hydrocyanic acid proceeds when there is merely a trace of ammonium salt present in the solution. This means that the amount of ammonia present need be very small. Of course, it is true that with very small percentages of catalyst in the reacting mass the time required for the reaction to proceed to completion is very great.

It has been found that an increase in the percentage of catalyst present, this percentage being based on the catalyst-hydrocyanic acid ratio, produces approximately a logarithmic decrease in the time of the reaction while the maximum temperature of the chemical change seems to remain almost entirely unaffected. These results were observed with all of the catalysts which we have employed. The maximum temperature of the reaction does not depend on the catalytic concentration in the reaction mass and, as has been previously pointed out, is apparently affected to but a relatively small extent by the hydrocyanic acid concentration of the charge.

When sodium hydroxide and sodium carbonate are used as control agents the same general considerations apply with the exception that with the higher catalytic concentrations there are substantial amounts of solid catalyst found in the product. This means that in order to produce a product of satisfactory purity there is a practical limit in the percent of sodium hydroxide or sodium carbonate which may be used. This limit is somewhere in the neighborhood of a catalytic concentration of 18% in the case of the carbonate and 32% in the case of sodium hydroxide. These values are based on the ratio of catalyst to the hydrocyanic acid content of the charge. The product can be purified by washing with water as these catalysts are water-soluble while the product is not.

Ordinarily we have found that better results are obtained with ammonia as the catalytic material. The use of sodium hydroxide or sodium carbonate results in the introduction of material into the product which is removable only by washing, whereas ammonia is removable by heating during the drying operation. Aqua ammonia on the other hand, is a very convenient source of catalytic action and one which can be easily introduced into the reaction vessel. It adds no solid material to the charge or product and in this respect is superior to either sodium hydroxide or sodium carbonate. For these reasons most of our work has been done with ammonia as the control agent and we can state that the most satisfactory results are obtained when the ratio of ammonia to hydrocyanic acid content is about 6% and the hydrocyanic acid content of the charge is in the neighborhood of 30%. The use of a reaction mixture having these proportions results in a slurry after the reaction which is not too stiff and which can be easily agitated with an ordinary mechanical stirrer. A thinner slurry is more easily handled during the transfer from reaction vessel to filter. As the hydrocyanic acid content is increased toward the higher concentrations, the stiffness of the material in the autoclave increases until with about 55% hydrocyanic acid concentration the charge becomes after the reaction a firm moist cake. Thirty per cent of hydrocyanic acid content is substantially the value at which the concentration of the solid in the slurry will be found to be most satisfactory from the viewpoint of stirring during the entire process, and also from the standpoint of ease of handling during the removal of the slurry from the reaction vessel.

It is thus evident that we have devised a flexible process which is available for commercial operation in the production of these new products. The decomposition and/or polymerization is controlled by agitation of the charge during the reaction period, proportioning the ingredients (hydrocyanic acid, catalyst and water) of the charge, and regulating the temperature by means of the water jacket. By selecting the catalytic material the purity of the resulting product can be varied. By selecting the proper concentration of catalytic agent in the reaction mixture the time of the reaction can be varied over wide limits. By adjusting the percentage of catalyst and concentration of hydrocyanic acid simultaneously it is possible to regulate the temperature required for the reaction so that the process may be commercially carried out with the minimum expense. Also, by stirring the mixture during the reaction it is possible to avoid undesirable "bumping" or localization of the reacting mass within the walls of the container. By employing a water bath it is possible to carry away the excess heat developed so that the temperature does not get beyond the limits of the apparatus. In brief, by adjusting the relative proportions of hydrocyanic acid, catalyst, and water in the reaction mixture it is possible to predetermine the character of the reaction product and the time and temperatures of the reaction. Stirring and the maintenance of the proper water bath temperature during incubation have also definite effects, within certain limits, on these characteristics of the reaction. This is what we mean by "predetermination" of the character of the reaction or reaction product wherever that term shall be used in the appended claims.

In order that our novel process and the products resulting therefrom may be entirely clear, the following examples of a practical method for utilizing it are appended. The details of the process described in the examples are to be considered as illustrative and our novel process is not to be limited to the exact manipulative details therein set forth.

Example I

The charge consisted of 32.4 pounds of commercial ammonium hydroxide, 150 pounds of commercial liquid hydrocyanic acid and 300 pounds of water. The ammonium hydroxide had an $NH_3$ content of 27% or 8.7 pounds. The hydrocyanic acid content was 144.75 pounds of 100% HCN. The total charge was 482.4 pounds.

The hydrocyanic acid concentration in the reaction mixture was 30%. The absolute $NH_3$ concentration was 1.8%, the ratio of ammonia to hydrocyanic acid being 6%. The percentage of water in the reaction mixture was 68.2%. The preliminary heating period before the temperature employed to initiate the reaction was reached comprised about 20 minutes. The "incubation" period lasted for 200 minutes. This was followed by the rapid decomposition period which lasted 40 minutes. The reaction period proper includes the "incubation" and rapid decomposition period and was 240 minutes or 4 hours.

After the completion of the reaction the slurry was removed from the reaction vessel and filtered. After drying, the product which consisted entirely of type B polymer, weighed 132 pounds. Type B polymer is the soft, dull black, amorphous variety. The yield amounted to 91% based upon the 100% HCN content of the commercial hydrocyanic acid used.

The filtrate and washing water weighed 295 pounds of which 2.81% or 8.3 pounds consisted of $NH_3$. The hydrocyanic acid content of the filtrate and wash water was 2.26% or 6.67 pounds. On evaporation 6.33% of solids were recovered from the filtration and washings.

Example II

The charge consisted of 2220 cc. of commercial hydrocyanic acid (96.5%), 282 grams of sodium hydroxide, and 2393 grams of water. The hydrocyanic acid content of the charge was 1500 grams which is the equivalent of 2220 cc. of the commercial acid, and the concentration of acid in the charge was 30%. The ratio of the weight of sodium hydroxide catalyst to the weight of hydrocyanic acid present was 18.8%.

It is convenient to refer the concentration of any catalyst other than ammonia to an equivalent $NH_3:HCN$ ratio which may be computed as follows:

$$\text{Equivalent } \frac{NH_3}{HCN} \text{ ratio} = \frac{NaOH}{HCN} \text{ ratio} \times \frac{\text{equivalent wt. of } NH_3}{\text{equivalent wt. of } NaOH}$$

for a NaOH:HCN ratio of 18.8% we have $$\text{Equivalent } \frac{NH_3}{HCN} \text{ ratio} = 18.8\% \times \frac{17.032}{40.005} = 8\% \text{ very closely}$$

The total reaction time was 190 minutes and the maximum temperature developed was 145° F. The yield of dry product was 1345 grams or 89.8%. The product was type B polymer.

An analysis of the filtrate revealed 6.0% HCN and 0.234% sodium hydroxide.

Example III

The charge consisted of 2220 cc. of commercial hydrocyanic acid (96.5%), 374 grams of sodium carbonate $Na_2CO_3$ and 3076 grams of water. The hydrocyanic acid content of the charge was 1500 grams, which is the equivalent of 2220 cc. of the commercial acid, and the concentration of acid in the charge was 30%. The ratio of sodium carbonate catalyst to hydrocyanic acid was 25% which is the equivalent of a $NH_3:HCN$ ratio of 8%.

The total reaction time was 255 minutes and the maximum temperature attained was 135° F. The yield of dry product was 1300 grams or 87%. The product was type B polymer.

An analysis of the filtrate revealed 4.84% HCN, and 0.215% equivalent alkali. The filtrate had a total solid content of 15%.

Throughout the claims the novel reaction products are referred to as polymers or polymerization products, and the process is termed one of polymerization. This nomenclature is in accordance with the usual practice which is followed regardless of the fact that the true chemical nature of the products or of the reaction by which they are produced is unknown. It is to be understood that the term "polymerization" wherever occurring is to be interpreted to cover decomposition as well as polymerization. In brief "polymerization" is equivalent to "polymerization and/or decomposition" and "polymer" is equivalent to "polymer and/or decomposition product", wherever these terms occur in the claims.

We claim:

1. A soft, dull black, apparently amorphous polymerized product of hydrocyanic acid.

2. A process for polymerizing hydrocyanic acid comprising maintaining an aqueous solution containing hydrocyanic acid and a polymerization catalyst at a temperature at which the polymerization can occur until the exothermic polymerization reaction commences and thereafter extracting heat from said solution at a rate sufficient to prevent the temperature from rising above about 250° F. until the polymerization reaction is substantially complete.

3. A process for polymerizing hydrocyanic acid comprising maintaining an aqueous solution containing hydrocyanic acid and a water soluble alkaline material at a temperature at which the polymerization can occur until the exothermic polymerization reaction commences and thereafter extracting heat from said solution at a rate sufficient to prevent the temperature from rising above about 250° F. until the polymerization reaction is substantially complete.

4. A process for polymerizing hydrocyanic acid comprising subjecting an aqueous solution containing 5 to 55% by weight of hydrocyanic acid, to the action of a water soluble alkaline material, with continuous agitation and applying cooling to maintain the reaction mixture at a temperature not materially higher than the boiling point of said mixture.

5. A process for polymerizing hydrocyanic acid comprising subjecting an aqueous solution containing 5 to 55% by weight of hydrocyanic acid, to the action of a water soluble alkaline material, with continuous agitation and applying cooling to maintain the reaction mixture at a temperature not higher than about 250° F.

6. A process for polymerizing hydrocyanic acid comprising subjecting an aqueous solution containing 5 to 55% by weight of hydrocyanic acid, to the action of ammonia, with continuous agitation and applying cooling to maintain the reaction mixture at a temperature not higher than about 250° F.

7. A process for polymerizing hydrocyanic acid comprising preparing an aqueous solution containing a water soluble alkaline material and hydrocyanic acid, applying heat to said solution until the exothermic polymerization reaction commences and thereafter continuously extracting heat from said solution at a rate sufficient to maintain the reaction mixture at a temperature not higher than about 250° F. until the polymerization reaction is substantially complete.

8. A process comprising continuously stirring an aqueous solution containing ammonia and in the neighborhood of 30% by weight of hydrocyanic acid, while heating said solution to a predetermined temperature until the exothermic polymerization reaction commences and thereafter cooling sufficiently to prevent the temperature from rising substantially above 250° F.

9. A process comprising continuously stirring an aqueous solution containing in the neighborhood of 30% by weight of hydrocyanic acid, an amount of ammonia equivalent to an ammonia to hydrocyanic acid ratio of about 6% while heating said solution to a temperature of about 130° F. until the exothermic polymerization reaction commences and thereafter cooling sufficiently to prevent the temperature from rising substantially above 250° F.

10. A process for polymerizing hydrocyanic acid comprising subjecting an aqueous solution containing not less than about 56% by weight of hydrocyanic acid to the action of a polymerization catalyst, while extracting sufficient heat from said solution to prevent the temperature thereof from rising above about 250° F.

11. A process for polymerizing hydrocyanic acid comprising subjecting an aqueous solution containing not less than about 56% by weight of hydrocyanic acid to the action of a water soluble alkaline material while extracting sufficient heat from said solution to prevent the temperature thereof from rising above about 250° F.

12. A process for polymerizing hydrocyanic acid comprising subjecting an aqueous solution containing not less than about 56% by weight of hydrocyanic acid to the action of ammonia while extracting sufficient heat from said solution to prevent the temperature thereof from rising above about 250° F.

13. A process for polymerizing hydrocyanic acid comprising maintaining an aqueous solution containing hydrocyanic acid and a catalyst selected from the group comprising hydroxides of the alkali and alkaline earth metals, alkaline salts of the alkali and alkaline earth metals, ammonia, ammonium salts and aliphatic and aromatic amines, at a temperature at which the polymerization can occur until the exothermic polymerization reaction commences and thereafter extracting heat from said solution at a rate sufficient to maintain the temperature of said solution not higher than about 250° F. until the polymerization reaction is substantially complete.

14. A process for polymerizing hydrocyanic acid comprising maintaining an aqueous solution containing hydrocyanic acid and an organic amine of alkaline character at a temperature at which the polymerization can occur until the exothermic polymerization reaction commences and thereafter extracting heat from said solution until the polymerization reaction is substantially complete.

15. A process for polymerizing hydrocyanic acid comprising contacting said acid with an organic amine, of alkaline character.

16. A process for polymerizing hydrocyanic acid comprising contacting said acid with an organic amine of alkaline character in aqueous solution.

HORACE CHAMBERLIN ADAMS.
HOWARD DONOVAN GREEN.